United States Patent [19]
Roberts

[11] Patent Number: 5,500,641
[45] Date of Patent: Mar. 19, 1996

[54] SAFETY SWITCH DEVICE FOR USE IN MANUFACTURE OF ROUND CYLINDRICAL VESSELS

[75] Inventor: Wayne L. Roberts, Tulsa, Okla.

[73] Assignee: Glens'Son, Tulsa, Okla.

[21] Appl. No.: 279,041

[22] Filed: Jul. 22, 1994

[51] Int. Cl.⁶ .................................................. G08B 21/00
[52] U.S. Cl. ........................... 340/686; 366/220; 340/666; 414/757
[58] Field of Search ................................ 33/529; 340/665, 340/666, 686, 689; 366/220; 414/433, 756, 757; 269/289 R

[56] References Cited

U.S. PATENT DOCUMENTS

| | | | |
|---|---|---|---|
| 3,480,158 | 11/1969 | Pandjiris et al. | 214/1 |
| 3,734,387 | 5/1973 | Sannipoli | 228/6 |
| 3,879,019 | 4/1975 | Fulkerson | 366/220 |
| 3,918,697 | 11/1975 | Gregory | 269/289 R |
| 4,274,282 | 6/1981 | Budraitis et al. | 340/665 |
| 4,392,568 | 7/1983 | Turnbough et al. | 198/781 |
| 4,793,466 | 12/1988 | Petitcollin et al. | 198/502.3 |
| 5,221,351 | 6/1993 | Esser et al. | 340/689 |

Primary Examiner—John K. Peng
Assistant Examiner—Albert K. Wong
Attorney, Agent, or Firm—Molly D. McKay

[57] ABSTRACT

The present invention is a device for simultaneously activating a warning device and deactivating turning rolls on which a vessel rotatably rests whenever the vessel rises off of one of the turning rolls. The device is provided with two safety switches which are positioned under and at either end of the vessel and adjusted so that a switch roller provided on a distal end of an upwardly biased switch arm of each safety switch engages the vessel, thereby causing the switch arm to move downward and thereby closing the switch. When the vessel moves upward, the switch opens. The switches are connected in a series circuit, with one leg of the series circuit supplying power to a contactor holding coil which controls a current controlling contactor in order to repeatedly make and break a circuit which supplies power to the turning rolls and a second leg of the series circuit supplying power to the warning device. The turning rolls are activated and the warning device is deactivated when all switches are closed. The turning rolls are deactivated and the warning device is activated when any switch is open.

18 Claims, 3 Drawing Sheets

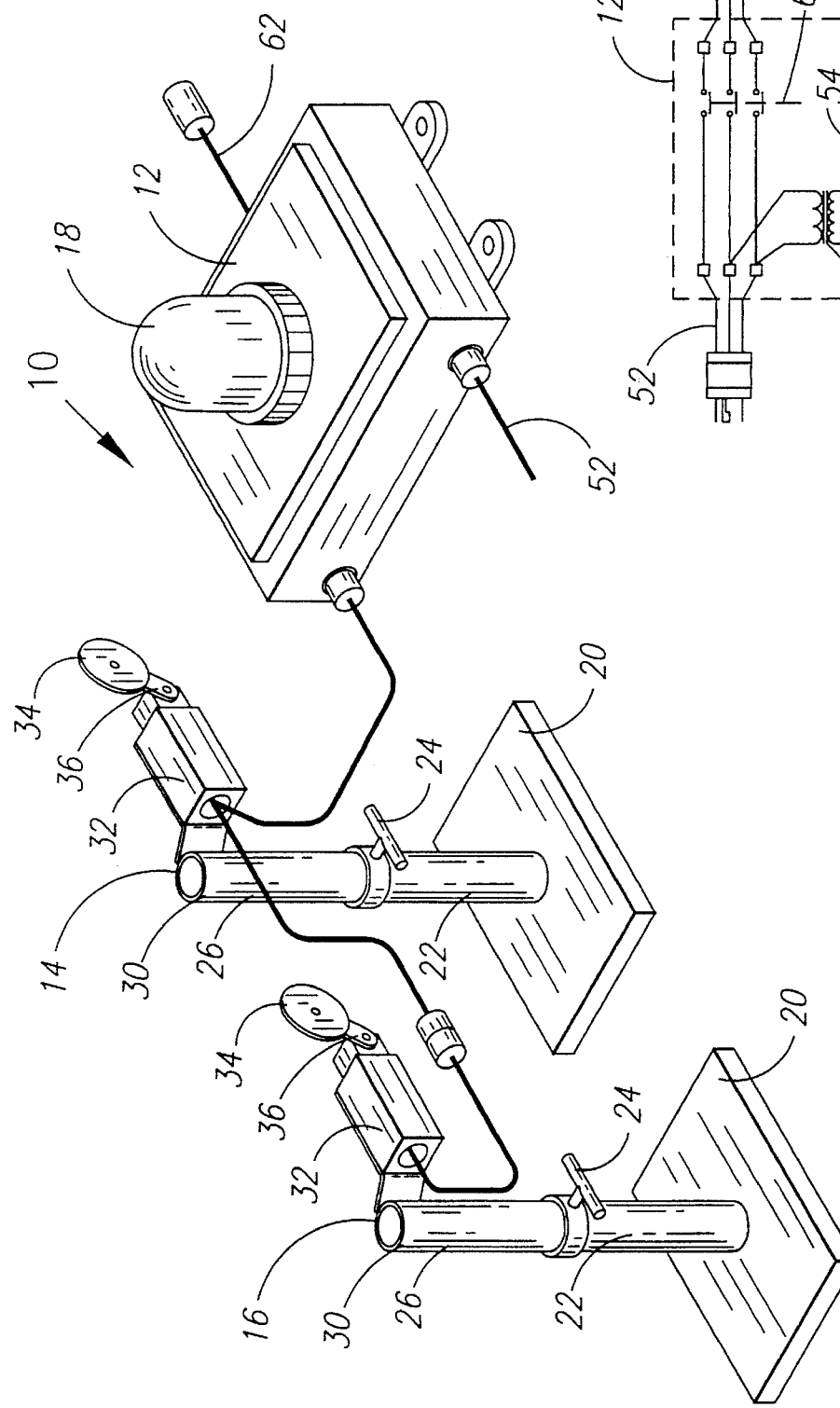
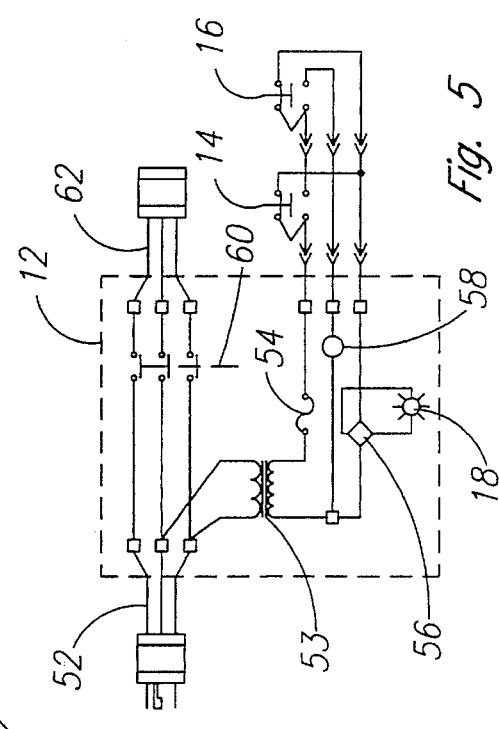
Fig. 1
Fig. 5

SAFETY SWITCH DEVICE FOR USE IN MANUFACTURE OF ROUND CYLINDRICAL VESSELS

BACKGROUND OF THE INVENTION

1. Field of the Invention

The present invention relates to a safety switch device for use in the manufacture of large, round cylindrical vessels. More specifically, the device is provided with interconnected switches which are positioned adjacent to a cylindrical vessel located on turning rolls such that if the vessel raises off one of the turning rolls, at least one of the switches will sense the movement of the vessel and will automatically deactivate the turning rolls, thus preventing the vessel from coming off the turning rolls and simultaneously activate a warning device.

2. Description of the Related Art

Construction of large cylindrical vessels is frequently accomplished with the vessel resting on turning rolls so that the cylindrical axis of the vessel lies in a horizontal position and the vessel is cradled on the roll tires of the turning rolls. The turning rolls are provided with motor means for rotating the roll tires and thereby rotating the vessel which rests thereon. Usually the motor means is an electric roll driving motor which attaches to and powers the rotation of the roll tires. The electrical roll driving motor is activated in order to rotate the vessel. When the electric roll driving motor is activated, the vessel rotates on the roll tires in a direction counter to the movement of the roll tires. For example, if the roll tires are rotating in a clockwise direction, the vessel will rotate in a counterclockwise direction.

The vessel will generally continue to rotate on the turning rolls until the roll tires encounter a non-uniform feature. Upon encountering a non-uniform feature, one or both ends of the vessel may move upward, driven by the propelling force of the motor driven turning rolls, resulting in a situation where the vessel can easily jump, roll or fall off the turning rolls and injure or destroy lives and equipment.

One object of the present invention is to provide a warning, either visual or audible or both, whenever the vessel rises off one of the turning rolls. Another object of the invention is to automatically discontinue power to the motor means which drives the turning rolls whenever the vessel rises off one of the turning rolls. Still a further object of the invention is to provide a relatively inexpensive safety device which can be used with existing turning rolls with little or no modification to existing equipment.

SUMMARY OF THE INVENTION

The present invention is a safety switch device for sensing when a vessel rises off of turning rolls supporting the vessel in order that the device may simultaneously provide a warning signal and stop the turning rolls and the vessel from rotating by disconnecting power to the motor means which drives rotation of the turning rolls. The device is provided with two safety switches and a control box which are electrically connected together in a series circuit. Power is supplied to the control box from an electrical receptacle and the control box supplies power to the motor means for the turning rolls. Each of the safety switches is provided with a limit switch which is activated by upward and backward movement of its switch arm as the switch arm moves upward and downward in conjunction with the vessel's vertical movement. The safety switches are positioned under the ends of the vessel with their switch rolls, which are located on the upwardly biased switch arm, rotatably engaging the vessel. The telescoping portion of the switch post of each safety switch is then adjusted so the limit switch is in its downward position. When both safety switches are in their downward position, a circuit supplying power to the warning device is broken and, simultaneously, a circuit is completed which supplies power to a contactor holding coil which in turn activates a current controlling contactor, thus connecting power to the motor means for the turning rolls and causing the vessel to rotate. If the vessel rises off of its turning rolls, one or more of the limit arms of the limit switches will move to their upward position, thus simultaneously activating the circuit to the warning device and deactivating the contactor holding coil, current controlling contactor, motor means and turning rolls, causing the vessel to cease its rotation.

BRIEF DESCRIPTION OF THE DRAWINGS

FIG. 1 is a perspective view of a safety switch device constructed according to a preferred embodiment of the present invention.

FIG. 5 is an electrical diagram for the safety switch device.

DETAILED DESCRIPTION OF THE PREFERRED EMBODIMENT

Figure 2:
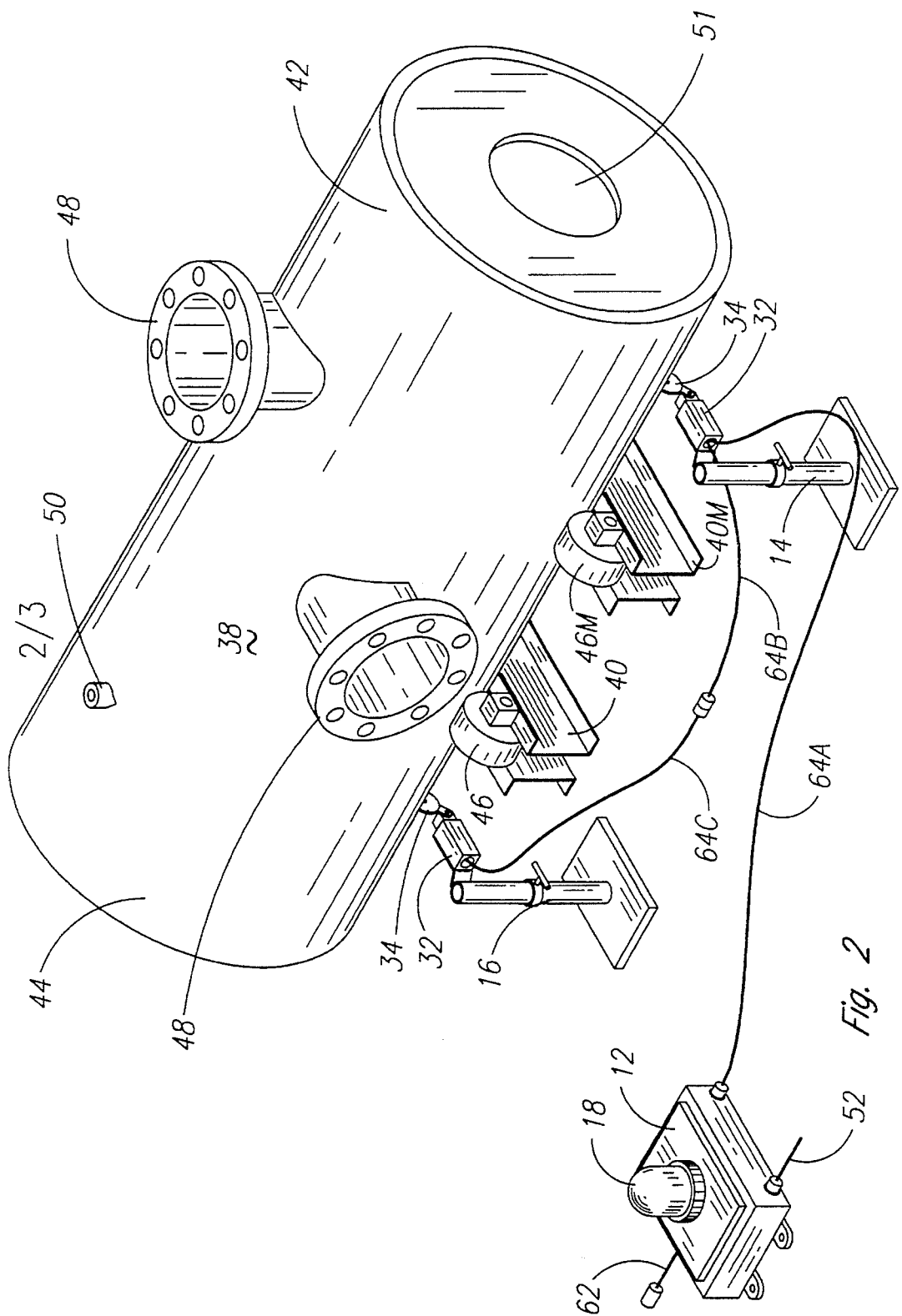
FIG. 2 is a perspective view showing the safety switch device of FIG. 1 installed for use with a cylindrical vessel movably mounted on turning rolls.

Referring now to the drawings, and initially to FIG. 1, there is illustrated a safety switch device 10 constructed according to a preferred embodiment of the present invention. The device 10 is comprised of a roll power control box 12, a first safety switch 14 and a second safety switch 16. The control box 12 and the first and second safety switches 14 and 16 are electrically interconnected as will be more fully described hereafter. The control box 12 is provided with a warning device, such as a red flashing warning light 18.

Figure 4:
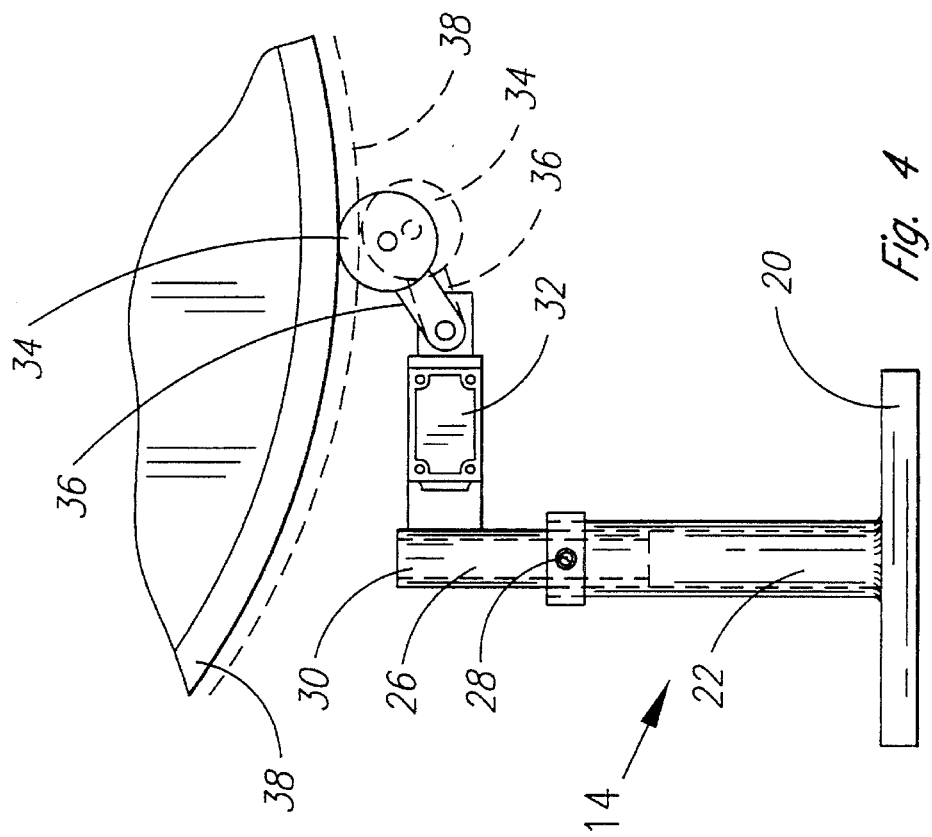
FIG. 4 is the switch of FIG. 3 shown in its upward position due to movement of the cylindrical vessel upward.
Figure 3:
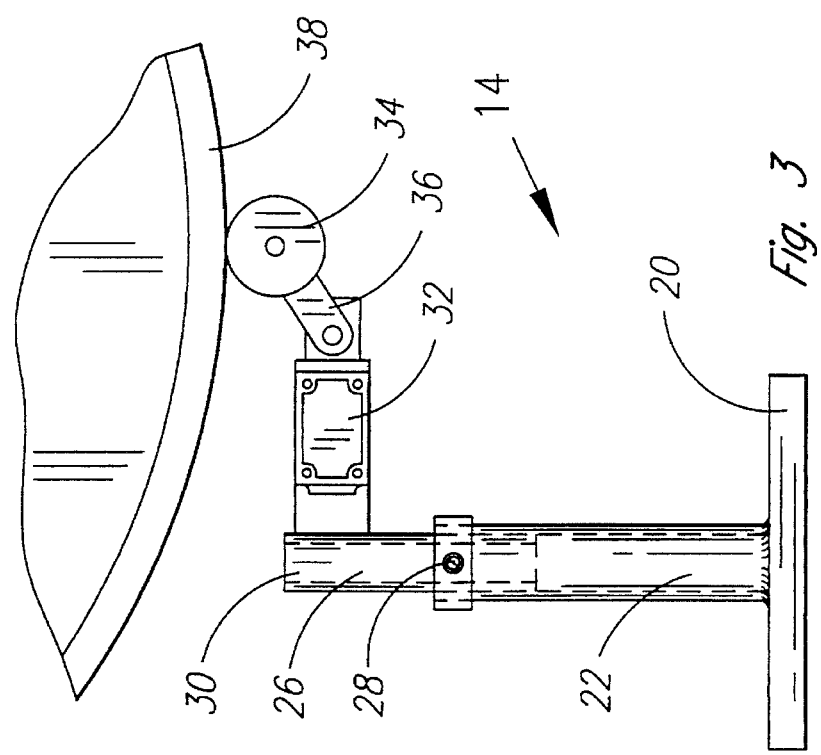
FIG. 3 is a right side elevation of one switch of the safety switch device shown in its downwardly position due to engagement of the cylindrical vessel with a switch roller located distally on an upwardly biased switch arm provided on the switch.

Each of the safety switches 14 and 16 is provided with a horizontal base 20 upon which the safety switch, either 14 or 16, rests upon the ground. Each safety switch 14 and 16 is also provided with a switch post 22 extending generally perpendicularly upward from the base 20. Each switch post 22 may be adjusted in height by loosening a thumb screw 24 provided on the switch post 22, raising a telescoping portion 26 of the switch post 22 and retightening the thumb screw As illustrated in FIGS. 3 and 4, set screws 28 may, alternately, be employed instead of thumb screws 24. If set screws 28 are employed, an Allen wrench (not illustrated) must be used to loosen and retighten the set screws 28 in order to adjust the height of the switch posts 22.

An upper end 30 of the telescoping portion 26 of each switch post 22 is provided with a limit switch 32. The limit switch 32 which is illustrated in FIGS. 1 through 4 is an electromechanical type limit switch. Alternately, the limit switch 32 may be an inductive type (not illustrated), a proximity type (not illustrated), or other suitable type of switch (not illustrated). Each limit switch 32 is provided with a rotatable switch roller 34 rotatably mounted to a distal end of an upwardly and downwardly movable switch arm 36 provided on the limit switch 32. The switch arm 36 is movably mounted to the limit switch 32 and is biased upward.

FIG. 2 illustrates use of the device 10 in the construction of a cylindrical vessel 38. The vessel 38 is turned onto its side and rotatably mounted on at least two turning rolls 40, with at least one turning roll 40 located at either end; i.e., a top end 42 and a bottom end 44, of the vessel 38. Each turning roll 40 is provided with a pair of rotatable roll tires 46 which cradle and rotatably support the vessel 38 above the ground. If more than two turning rolls 40 are employed, the remaining turning rolls 40 are placed somewhere between the top and bottom ends 42 and 44.

One of the turning rolls 40 which will be designated hereafter as 40M, is provided with motor means (not illustrated) for rotating at least one of its roll tires, hereafter designated as 46M, and thereby rotating the vessel 38 which is supported thereon. The remaining turning roll or rolls 40 are not provided with motor means and the roll tires 46 of these non-motorized turning rolls 40 rotate in response to and in a direction opposite to the rotation of the vessel 38.

During construction of the vessel 38, non-uniform features such as flanges 48, nipples 50, nozzles (not illustrated), brackets (not illustrated) may be added to the vessel 38 and will extend outward therefrom. Also cutouts 51 may be made in the vessel 38 during construction of the vessel 38. If any of the cutouts 51 or non-uniform features is encountered by a roll tire 46, the vessel 38 could suddenly move either upward or downward relative to the turning rolls 40 and 40M and relative to the ground on which the turning rolls 40 and 40M rest. Such a sudden upward or downward movement of the vessel 38, combined with the continuing rotation of the roll tire 46M, can cause the vessel 38 to "jump" off one or more of the turning rolls 40 and 40M. When this happens, the vessel 38, which may weigh a considerable amount, can roll off the turning rolls 40 and 40M, and onto people and equipment (not illustrated), resulting in injury or death of people and damage or destruction of equipment. In addition, the vessel 38 may also be damaged when it jumps off the turning rolls 40 and 40M.

To prevent this from occurring, it is normal practice to position the turning rolls 40 and 40M relative to the vessel 38 so that the roll tires 46 do not encounter a non-uniform feature or a cutout 51. Even though the vessel 38 is initially positioned properly on the turning rolls 40 and 40M, upon being rotated, the vessel 38 can "walk" slightly longitudinally on the turning rolls 40 and 40M so that a nonuniform feature or cutout 51 is encountered by a roll tire Alternately, a non-uniform feature or cutout 51 which had not been planned for when the vessel 38 was positioned on the turning rolls 40 and 40M may be added later and may be located so it will be encountered by a roll tire 46 as the vessel 38 is rotated.

In order to install the device 10, and before the safety switches 14 and 16 are placed under the vessel 38, the control box 12 plugs by means of a power supply cord 52 into a power source such as an electrical receptacle (not illustrated but usually a three-phase 480 V receptacle) into which the motor means for the turning roll 40M would normally be plugged. As illustrated in FIG. 5, when electrical power is provided to the control box 12 via the power supply cord 52, power is supplied to a transformer 53 located in the control box 12, thus providing low voltage power (preferably 24 V) to a series circuit. The series circuit includes a fuse 54, the first and second safety switches 14 and 16, with one leg of the series circuit including a bridge rectifier 56 for converting AC to DC power and the D.C. warning light 18, and with the other leg of the series circuit including a contactor holding coil 58.

Before the safety switches 14 and 16 are placed under the vessel 38, the switch arms 36 of safety switches 14 and 16 are in open raised positions, as illustrated for one safety switch 14 in FIG. 4 by the switch arm 36 and switch roller 34 shown in solid lines. Referring now to FIG. 5, when both safety switches 14 and 16 are in their open raised positions, a circuit is completed to the bridge rectifier 56 and the light 18, causing the light 18 to shine and, simultaneously, a circuit to the contactor holding coil 58 is broken. When there is no power to the contactor holding coil 58, a current controlling contactor 60 which is associated with the contactor holding coil 58 disconnects power between the power supply cord 52 and a motor means supply cord 62. The motor means which rotates the vessel 38 is plugged into and receives its power from the motor means supply cord 62. Thus, when there is no power to the contactor holding coil 58, the vessel 38 ceases rotating.

The safety switches 14 and 16 are next positioned relative to the vessel, preferably under the vessel 38 as illustrated in FIG. 2, and preferably with at least one located at either end 42 and 44 of the vessel 38. The safety switches 14 and 16 are positioned so the switch rollers 34 rotate along an axis which is parallel to an axis along which the vessel 38 rotates and located so the safety switches 14 and 16 do not encounter any non-uniform features or cutouts 51 as the vessel 38 is rotated.

The control box 12 and the safety switches 14 and 16 are provided with specially designed electrical cords 64A, 64B, and 64C which are designed so that they can only be connected together one way and when connected properly, form the electrical circuit illustrated in FIG. 5. Additional lengths of specially designed electrical cord (not illustrated) may be provided to connect additional safety switches to the device 10 or to accommodate vessels 38 of great height.

The thumb screw 24, or alternately the set screw 28, of each safety switch 14 and 16 is next loosened, the telescoping portion 26 of each is then raised until the switch roller 34 engages the vessel 38 and forces the switch arm 36 downward to a closed lowered position as illustrated in FIG. 3.

As illustrated in FIG. 5, when both safety switches are positioned under the vessel 38 and their switch arms are in their lowered closed position, power is simultaneously disconnected from the warning light 18 and connected to the contactor holding coil 58. Power to the contactor holding coil 58 causes the current controlling contactor 60 to move and connect power to the motor means supply cord 62, thus causing the motor means to begin rotating the vessel 38.

If the vessel 38 begins to raise off one of the turning rolls 40 or 40M, as illustrated by the solid lines in FIG. 4, from its original position on the turning rolls 40 and 40M, as illustrated by the broken lines in FIG. 4, this movement of the vessel 38 causes the switch arm 36 of one or more of the switches 14 and 16 to return to its raised open position. Whenever one or more of the switch arms 36 returns to its raised position, power is immediately disconnected from the motor means and turning roll 40M and, simultaneously, power is connected to the warning light 18, thus activating the warning light. By immediately stopping rotation of the vessel 38, the vessel 38 is prevented from jumping off the turning rolls 40 and 40M. Activation of the warning light 18 alerts operating personnel of the problem so the vessel 38 can be safely repositioned on the turning rolls 40 and 40M. Once the vessel 38 has been repositioned, the safety switches 14 and 16 are again placed under the vessel 38 and adjusted as previously described.

Although a warning light 18 is illustrated, other warning devices such as an audio alarm (not illustrated) or other suitable warning devices may be used in addition to or as an alternate to the warning light 18.

While the invention has been described with a certain degree of particularity, it is manifest that many changes may be made in the details of construction and the arrangement of components without departing from the spirit and scope of this disclosure. It is understood that the invention is not limited to the embodiment set forth herein for the purposes of exemplification, but is to be limited only by the scope of the attached claim or claims, including the full range of equivalency to which each element thereof is entitled.

What is claimed is:

1. A device for simultaneously activating an alarm and disconnecting power to turning rolls used in rotating a horizontally oriented vessel whenever the vessel rises off one of its turning rolls, comprising:

a control box for receiving power in from an external power source and for providing power out to a motor which drives a turning roll on which a vessel rotatably rests;

at least two switches positionable relative to said vessel such that all said switches are closed when the vessel is resting properly on its turning rolls and such that the switches open independently of each other whenever the vessel moves upward relative to said switches; and said switches being connected to a power source by a series circuit, said series circuit being provided with a first leg connecting to a means for reversibly disconnecting power to said motor, said series circuit being provided with a second leg connecting to a warning device so that power is simultaneously connected to said motor and disconnected from said warning device whenever all said switches are closed and so that power is simultaneously disconnected from the motor and connected to the warning device whenever at least one said switch is open.

2. The device of claim 1 further comprising each said switch being provided with a limit switch movable between a lower closed position and a raised open position, each limit switch being movably provided with an upwardly biased switch arm, a distal end of each said switch arm being provided with a switch roller which rotatably engages the vessel when the switch is properly positioned relative to the vessel.

3. The device of claim 1 further comprising each said switch being provided with an adjustable switch post which can be adjusted vertically in order to properly position the switch relative to the vessel.

4. The device of claim 1 wherein the warning device is a red light.

5. The device of claim 1 wherein the series circuit obtains power via a transformer attached to the external power source.

6. The device of claim 1 wherein said means for reversibly disconnecting power further comprises a contactor holding coil, said contactor holding coil being connected to and controlling the movement of a current controlling contactor located in a power supply circuit established between the external power source and the motor such that said current controlling contactor repeatedly makes and breaks the power supply circuit, said contactor holding coil operating said current controlling contactor so that the power supply circuit is made to the motor when power is provided to the contactor holding coil and the power supply circuit is broken when power is removed from the contactor holding coil.

7. The device of claim 1 further comprising a fuse being provided in said series circuit.

8. The device of claim 4 wherein the red light is powered by D.C. power provided by a bridge rectifier, said rectifier receiving power from a transformer, and said transformer receiving power via the external power source.

9. A device for preventing a cylindrical vessel from jumping off of turning rolls on which the vessel rotates during construction of the vessel comprising:

at least two switches positioned relative to a horizontally rotatable vessel, each said switch being provided with switch means for closing a series circuit when the vessel is resting properly on its turning rolls and for opening said series circuit when the vessel moves upward relative to said switches, said series circuit connecting said switches to a power source, said series circuit being provided with a first leg connecting to a means for disconnecting and reconnecting power to a motor, said motor connected to and controlling rotation of said turning rolls, said series circuit being provided with a second leg connecting to a warning device so that said series circuit simultaneously provides power to a warning device and removes power from the motor when the series circuit is open and simultaneously removes power from the warning device and provides power to the motor when the series circuit is closed.

10. The device of claim 9 further comprising each said switch means being comprised of a limit switch movable between a lower closed position and a raised open position, a switch arm being movably provided on each said limit switch, a rotatable switch roller being rotatably provided on a distal end of each said switch arm, and each said switch roller being engagable with said vessel when said switches are properly positioned relative to said vessel.

11. The device of claim 9 further comprising each said switch being provided with adjustment means for adjusting the switch vertically in order to properly position the switch relative to said vessel.

12. The device of claim 9 wherein the warning device is a red light.

13. The device of claim 9 wherein a transformer attached to an external power source supplies low voltage power to the series circuit.

14. The device of claim 9 wherein said means for disconnecting and reconnecting power further comprises a contactor holding coil, said contactor holding coil being connected to and operating a current controlling contactor for repeatedly making and breaking a power supply circuit existing between an external power source and the motor.

15. The device of claim 9 further comprising a fuse being provided in said series circuit.

16. The device of claim 12 wherein the red light is powered by D.C. power provided by a bridge rectifier, said rectifier receiving power from a transformer, and said transformer receiving power via an external power source.

17. A device for simultaneously activating an alarm and disconnecting power to turning rolls used in rotating a horizontally oriented vessel whenever the vessel rises off one of its turning rolls, comprising:

a control box for receiving power in from an external power source and for providing power out to a motor which drives a turning roll on which a vessel rotatably rests;

at least two switches positionable relative to said vessel such that all said switches are closed when the vessel is resting properly on its turning rolls and such that the switches open independently of each other whenever the vessel moves upward relative to said switches; and said switches being connected to a power source by a circuit, said series circuit being provided with a first leg connecting to a means for disconnecting and reconnecting power to a motor connected to and controlling movement of a turning roll so that power is connected to the motor whenever all said switches are closed and so that power is disconnected from the motor whenever at least one said switch is open.

18. The device of claim 17 further comprising said series circuit being provided with a second leg connecting to a warning device so that power is disconnected from said warning device whenever all said switches are closed and so that power is connected to said warning device whenever at least one said switch is open.

* * * * *